United States Patent Office 3,296,945
Patented Jan. 10, 1967

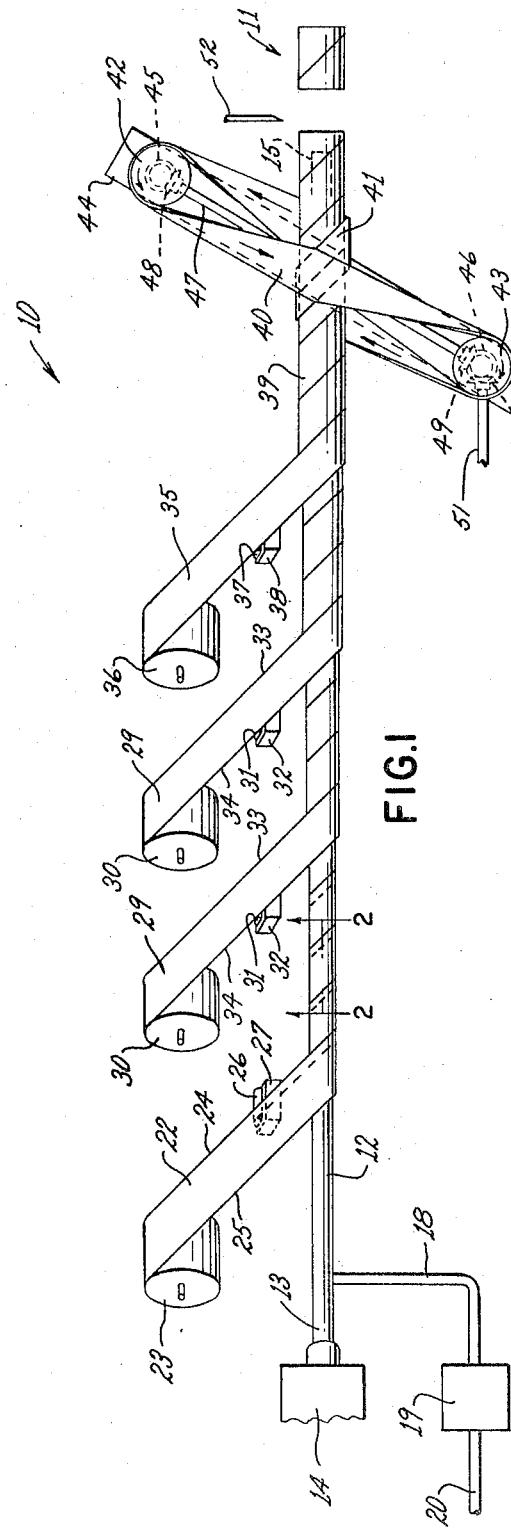

3,296,945
METHOD AND APPARATUS FOR MAKING A CONTAINER OR THE LIKE ON A FLUID COVERED AND/OR VIBRATED MANDREL
Daniel S. Cvacho and Calvin L. Wilson, Chesterfield County, and Charles T. Payne, Jr., Richmond, Va., assignors to Reynolds Metals Company, Richmond, Va., a corporation of Delaware
Filed Nov. 23, 1962, Ser. No. 239,610
6 Claims. (Cl. 93—80)

This invention relates to an improved method and apparatus for making a container or the like as well as to an improved container produced by such method or apparatus.

It is well known that helically wound composite containers are formed by helically winding and axially advancing strips of container material on a stationary cylindrical mandrel in such a manner that a continuous length of tubular container stock is progressively moved beyond the free end of the mandrel to be cut into desired lengths to form individual container bodies, the container bodies being subsequently filled with the desired product and closed by suitable end closures.

For example, one such composite container comprises an inner liner having the inner face thereof formed of metallic foil and engaging the mandrel, the strip of lining material having adjacent edges of adjacent convolutions thereof disposed in overlapping relation and secured together by a suitable adhesive or the like.

Subsequently, one or more strips of container body material, such as cardboard or the like, are helically wound in spaced relation on the helically wound liner core to provide body strength for the subsequently formed container bodies.

To complete the container body stock, a strip of wrapping or labeling material is helically wound onto the helically wound container body material and secured thereto by a suitable adhesive, the wrapping material having adjacent edges of adjacent convolutions thereof disposed in overlapping relation and secured together by a suitable adhesive with the outer surface of the wrapping material normally comprising metallic foil or the like.

It has been found that when such composite containers are formed on a stationary mandrel or the like, the relative movement between the mandrel and the engaging face of the liner material produces friction which tends to retard rotation and axial movement of the container body stock on the mandrel.

Therefore, in the past, suitable slip material was either coated on the mandrel and/or applied to the engaging surface of the lining material to facilitate the relative movement therebetween during the formation of the container body stock.

According to the teachings of this invention, however, means are provided for either eliminating the use of such slip material or for augmenting the same to facilitate relative movement between the mandrel and the container body stock being formed thereon.

In particular, one embodiment of this invention provides means for creating a cushion or film of fluid between the external surface of the mandrel and the contacting surface of the container material being helically wound and axially advanced thereon, the cushion of fluid providing frictionless means between the mandrel and the engaging container material.

Another embodiment of this invention provides means for vibrating the mandrel, such as by mechanical or electronic means, either in combination with the above described cushion or film of fluid or by itself to reduce the friction between the mandrel and the engaging container material.

Therefore, it is an object of this invention to provide an improved apparatus having one or more of the novel features set forth above or hereinafter shown or described.

Another object of this invention is to provide an improved method having one or more of the novel features set forth above or hereinafter shown or described.

A further object of this invention is to provide an improved container made by such a method or the like.

Other objects, uses and advantages of this invention are apparent from a reading of this description which proceeds with reference to the accompanying drawings forming a part thereof and wherein:

FIGURE 1 is a schematic perspective view illustrating one embodiment of the method and apparatus of this invention for forming container bodies or the like.

FIGURE 2 is an enlarged, fragmentary, exaggerated, cross-sectional view taken on line 2—2 of FIGURE 1.

FIGURE 3 is a view similar to FIGURE 2 and illustrates another embodiment of this invention.

FIGURE 4 is a fragmentary, schematic, perspective view illustrating another application of this invention.

FIGURE 5 is a view similar to FIGURE 4 and illustrates still another application of this invention.

FIGURE 6 is a fragmentary view similar to FIGURE 1 illustrating another embodiment of the method and apparatus of this invention.

While the various features of this invention are hereinafter described and illustrated as being particularly adaptable for forming containers or the like, it is to be understood that the various features of this invention can be utilized singly or in any combination thereof to provide other constructions as desired.

Therefore, this invention is not to be limited to only the embodiments illustrated in the drawings, because the drawings are merely utilized to illustrate some of the wide variety of uses of this invention.

Referring now to FIGURE 1, the improved method and apparatus of this invention is generally indicated by the reference numeral 10 and comprises means for making helically wound composite container bodies 11.

The apparatus 10 comprises a hollow, stationary mandrel 12 having one end 13 thereof secured in cantilevered fashion to a supporting structure 14 whereby the other free end 15 of the hollow mandrel 12 is disposed remote from the supporting structure 14.

The embodiment of the mandrel 12 illustrated in FIGURES 1 and 2 includes a bore 16 passing therethrough and defining an internal peripheral surface 17 of the mandrel 12.

The opposed ends 13 and 15 of the mandrel 12 are suitably closed and the bore 16 thereof is interconnected to a source of fluid placed under pressure in any suitable manner.

For example, the bore 16 of the mandrel 12 can be interconnected to a conduit 18 leading from a pressurizing apparatus 19, such as a pump or the like, receiving fluid from an inlet conduit 20.

The mandrel 12 is formed of porous material, such as porous bronze, iron or other material, whereby the fluid conveyed under pressure to the bore 16 of the mandrel 12 is adapted to pass to the exterior surface 21 of the mandrel 12 through the pores thereof.

In this manner, a film or cushion of the pressurized fluid is adapted to be disposed around the exterior surface 21 of the mandrel 12 for a purpose hereinafter described.

While FIGURE 1 illustrates schematically one means of utilizing the apparatus 10 to form the container bodies 11, it is to be understood that the various layers of container material forming the container bodies 11 can be varied as desired and this invention is not to be limited to the specific example hereinafter described.

As illustrated in FIGURE 1, a strip of lining material 22 is continuously fed from a free wheeling supply roll 23 onto the mandrel 12 in a manner hereinafter described so that adjacent edges 24 and 25 of the strip of lining material 22 overlap each other, the overlapping edges 24 and 25 being secured together by a suitable adhesive applied to the undersurface of the edge 24 by an adhesive applicator roller 26 receiving a suitable adhesive from a reservoir 27.

As the lining material 22 is being continuously helically wound and axially advanced on the mandrel 12 in a manner hereinafter described, the fluid being forced from the interior of the mandrel 12 to the exterior thereof forms a film or cushion between the overlapping convolutions of the lining material 22 and the exterior surface 21 of the mandrel 12 to facilitate the rotational and axial movement of the helically wound liner material 22 relative to the mandrel 12 in a manner heretofore unobtainable in the container making art.

Thus, it can be seen in the exaggerated form in FIGURE 2 that a cushion or film of fluid 28 is disposed between the undersurface of the liner material 22 and the exterior surface 21 of the mandrel 22 to substantially reduce any friction therebetween.

Thus, the aforementioned slip material which was normally required to be either placed on the exterior surface of the mandrel 12 or the undersurface of the lining material 22 to reduce friction between the lining material and the mandrel 12 can now be eliminated or can be augmented by the cushion or film of fluid 28 of this invention.

While the strip of lining material 22 can be formed of any suitable material and in any suitable manner, the embodiment thereof illustrated in the drawings comprises a lamination of a strip of metallic foil, such as aluminum-containing metallic foil or the like, and a strip of paper backing material whereby the foil face of the strip of lining material 22 forms the interior surface of the container bodies 11.

One or more strips of container body material 29 are fed onto the helically wound lining material 22 in the manner illustrated in FIGURE 1, the container body material 29 being fed from free wheeling supply rolls 30 and having the undersurfaces thereof coated with suitable adhesive by an adhesive applicator roller 31 receiving suitable adhesive from reservoirs 32.

Normally, the adjacent edges 33 and 34 of each strip of container body material 29 are disposed in abutting relation rather than overlapping relation to build up the body thickness of the container bodies 11, the strips of container body material 29 comprising paperboard stock or the like.

A strip of wrapping or labeling material 35 is subsequently helically wound onto the container body material 29, the wrapping material 35 being drawn from a free wheeling supply roll 36 and having the undersurface thereof coated with a suitable adhesive by an applicator roller 37 receiving adhesive from a reservoir 38.

Normally, the strip of wrapping material 35 comprises a lamination of a strip of metallic foil, such as aluminum-containing metallic foil or the like, and a strip of paper backing material, the metallic face of the strip of wrapping material 35 providing the exterior surface of the container bodies 11.

As the various strips of material 22, 29 and 35 are helically wound onto the mandrel 12 to form the container body stock 39 being continuously rotated and axially advanced to the right beyond the free end 15 of the mandrel 12, the fluid is conveyed to the interior of the mandrel 12 and is continuously being forced to the outer surface 21 thereof to provide a film or cushion of fluid 28 between the exterior surface 21 of the mandrel 12 and the undersurface of the lining material 22 to facilitate rotation and axial movement of the container body stock 39 relative to the mandrel 12 so that friction will not tend to retard such movement nor deface the undersurface of the lining material 22.

While any suitable means can be utilized to continuously draw and helically wind the strips of material 22, 29 and 35 onto the mandrel 12 to produce the container body stock 39, one such means is illustrated in FIGURE 1 and comprises a crossed belt 40 having a portion 41 thereof looped around the container body stock 39 whereby continuous movement of the belt 40 in the direction indicated by the arrows causes the container body stock 39 to be rotated and axially advanced on the mandrel 12 to draw the strips of material 22, 29 and 35 thereon in the manner previously described.

The crossed belt 40 is disposed around a pair of pulleys 42 and 43 respectively carried on a frame means 44, the pulleys 42 and 43 respectively carrying beveled gears 45 and 46 interconnected together to rotate in unison by a drive shaft 47 carrying a pair of beveled gears 48 and 49 at the opposed ends thereof and respectively disposed in meshing relation with the beveled gears 45 and 46.

The beveled gear 46 carried by the pulley 43 is also interconnected to a beveled gear 50 interconnected to a drive shaft 51 which, when rotated in the direction indicated by the arrow, causes the crossed belt 40 to move in the direction indicated by the arrows to rotate and axially advance the container body stock 39 on the mandrel 12.

As the container body stock 39 is axially advanced and rotated beyond the free end 15 of the mandrel 12, a suitable cutter 52 cuts the container body stock 39 into desired lengths.

For example, the cutter 52 can cut the container body stock 39 into the individual container bodies 11 or may cut the same into elongated lengths which can be subsequently cured and, thereafter, cut into individual container bodies 11, as desired.

Accordingly, it can be seen that this invention provides an improved method and apparatus for making container bodies or the like wherein friction between the forming mandrel and the undersurface of the first layer of container material wound thereon is substantially reduced or eliminated by a cushion or film of fluid whereby prior known slip material can be eliminated or augmented by the teachings of this invention to produce container bodies in a more rapid manner than heretofore possible without damaging the container material.

While the term "fluid" has been utilized throughout the specification and claims, it is to be understood the same can comprise a gaseous or liquid product.

For example, the fluid can comprise hot or cold air fed under pressure to the interior of the mandrel 12 by the pressurizing means 19.

While the porous hollow mandrel 12 can be formed in any suitable manner and of any suitable material, the embodiment thereof illustrated in the drawings can be formed by casting powdered bronze about a polished carbon core so that when the powdered bronze solidifies, the carbon core can be removed intact to produce the bore 16 in the mandrel 12.

Another embodiment of the mandrel of this invention is generally indicated by the reference numeral 12a in FIGURE 3 and comprises a metallic, plastic or other material having a bore 53 passing therethrough to define an interior surface 54 of the mandrel 12a.

The interior of the mandrel 12a is interconnected to the exterior surface 55 thereof by a plurality of bores or apertures 56 suitably formed therein in any desired pattern to produce the film or cushion of fluid 28 between the exterior surface 55 of the mandrel 12a and the undersurface of the lining material 22 in the manner previously described.

While the mandrels of this invention have been described in connection with making container bodies or the like, it is to be understood that the same can be utilized for other applications thereof.

For example, as illustrated in FIGURE 4, the mandrel 12 is supported in cantilevered fashion by a supporting structure 57 and is utilized to reverse or change the direction of a strip of material 58 traveling in the direction indicated by the arrows.

Because the mandrel 12 illustrated in FIGURE 4 is adapted to provide a cushion or film of fluid between the engaging surface of the strip of material 58 and the mandrel 12, friction between the mandrel 12 and the strip of material 58 is substantially reduced so that the direction of the traveling strip of material 58 can be changed to any desired direction without appreciably slowing the speed of movement of the strip of material 58.

As illustrated in FIGURE 5, the mandrels 12 of this invention can be utilized in any desired manner to reverse a traveling strip of material 59 being fed from a supply roll 60 so that the desired side of the strip of material 59 can be facing outwardly as illustrated without rewinding the roll 60 of material 59.

For example, the mandrels 12 can be disposed at right angles relative to each other to reverse the strip of material 59 traveling in the direction indicated by the arrows.

Because the mandrels 12 illustrated in FIGURE 5 produce a film or cushion of fluid between the engaging surfaces of the strip of material 59 and the exterior surfaces of the mandrels 12, any friction therebetween is substantially eliminated in the manner previously described.

Another embodiment of the method and apparatus of this invention is illustrated in FIGURE 6 and can be utilized by itself or in combination with the method and apparatus illustrated in FIGURES 1–5 and previously described.

The embodiment of the method and apparatus illustrated in FIGURE 6 also reduces friction between a traveling web or strip of material and a stationary surface disposed in engagement with the web or strip of material by vibrating the stationary surface either mechanically or electronically.

In particular, the embodiment of this invention is illustrated in FIGURE 6 for vibrating the mandrel 12 along the longitudinal axis thereof while the container body stock is being continuously produced and rotated and axially advanced on the mandrel 12 in the manner previously described.

While any suitable means can be utilized to vibrate the mandrel 12, the embodiment thereof illustrated in the drawings comprises an ultrasonic transducer or means 61 for ultrasonically vibrating the mandrel 12 in the direction indicated by the arrows to tend to reduce the friction between the mandrel 12 and the engaging surface of the strip of material 22 being helically wound thereon.

However, it is to be understood that the vibrating means 61 can vibrate the mandrel 12 transverse to its longitudinal axis or both transverse or longitudinally relative thereof or in any other desired direction or combination of directions, the important feature being to vibrate the mandrel 12 in such a manner that the engaging surface of the strip material 22 tends to move relative to the mandrel 12 with less frictional retardation than when the mandrel 12 is not vibrated.

Thus, it can be seen that the vibrating means 61 of this invention can be utilized in combination with the fluid cushion providing means of this invention to further facilitate relative movement between a traveling web or strip of material and a stationary surface engaging the web or strip of material.

Accordingly, it can be seen that this invention provides improved methods and apparatus for reducing friction between a traveling web or strip of material and a stationary surface engaging the web or strip of material.

Further, this invention provides an improved product made by the method and apparatus of this invention.

While the form of the invention now preferred has been disclosed as required by the statutes, other forms may be used, all coming within the scope of the claims which follow.

What is claimed is:

1. A method for making a container or the like comprising the steps of providing a mandrel, holding one end of said mandrel stationary, helically winding and axially advancing container material on said mandrel, and vibrating said mandrel relative to said rotating and axially advancing container material to facilitate rotational and axial movement of said container material relative to said mandrel while said one end thereof is held stationary.

2. A method as set forth in claim 1 and including the step of providing a cushion of fluid between the external surface of said mandrel and said container material to further facilitate movement of said container material relative to said mandrel.

3. Apparatus for making a container or the like comprising a mandrel adapted to have a strip of container material helically wound and axially advanced thereon, means for holding one end of said mandrel stationary, and means for vibrating said mandrel relative to said rotating and axially advancing container material to facilitate rotational and axial movement of said container material relative to said mandrel while said one end thereof is held stationary.

4. Apparatus as set forth in claim 3 and including means for providing a cushion of fluid between the external surface of said mandrel and said container material to further facilitate movement of said container material relative to said mandrel.

5. A method for making a container or the like comprising the steps of helically winding and axially advancing container material on a mandrel, and ultrasonically vibrating said mandrel relative to said rotating and axially advancing container material to facilitate rotational and axial movement of said container material relative to said mandrel.

6. Apparatus for making a container or the like comprising a mandrel adapted to have a strip of container material helically wound and axially advanced thereon, and means for ultrasonically vibrating said mandrel relative to said rotating and axially advancing container material to facilitate rotational and axial movement of said container material relative to said mandrel.

References Cited by the Examiner

UNITED STATES PATENTS

| 1,034,915 | 8/1912 | Kaiser | 93—80 |
| 1,625,470 | 4/1927 | Jauch | 93—80 |
| 3,044,372 | 7/1962 | Humphreys | 93—80 |
| 3,169,589 | 2/1965 | Bodine. | |

FOREIGN PATENTS 955,943  1/1957  Germany.

FRANK E. BAILEY, *Primary Examiner.*